United States Patent
Gupta et al.

(10) Patent No.: US 9,461,832 B2
(45) Date of Patent: Oct. 4, 2016

(54) MULTICAST ROUTING PROTOCOL FOR COMPUTER NETWORKS

(71) Applicant: Board of Trustees, Southern Illinois University, Carbondale, IL (US)

(72) Inventors: Bidyut Gupta, Carbondale, IL (US); Sindoora Koneru, Carbondale, IL (US); Shahram Rahimi, Carbondale, IL (US)

(73) Assignee: Board of Trustees, Southern Illinois University, Carbondale, IL (US)

( * ) Notice: Subject to any disclaimer, the term of this patent is extended or adjusted under 35 U.S.C. 154(b) by 144 days.

(21) Appl. No.: 14/341,425

(22) Filed: Jul. 25, 2014

(65) Prior Publication Data
US 2015/0030023 A1    Jan. 29, 2015

Related U.S. Application Data

(60) Provisional application No. 61/858,409, filed on Jul. 25, 2013.

(51) Int. Cl.
*H04L 12/18* (2006.01)
*H04L 12/753* (2013.01)
*H04L 12/733* (2013.01)
*H04L 12/761* (2013.01)

(52) U.S. Cl.
CPC ............... *H04L 12/18* (2013.01); *H04L 45/16* (2013.01); *H04L 45/20* (2013.01); *H04L 45/48* (2013.01)

(58) Field of Classification Search
None
See application file for complete search history.

(56) References Cited

U.S. PATENT DOCUMENTS

| | | | |
|---|---|---|---|
| 7,944,846 B1* | 5/2011 | Cai | H04L 12/6418 370/252 |
| 2005/0083933 A1* | 4/2005 | Fine | H04L 12/18 370/390 |
| 2006/0250999 A1* | 11/2006 | Zeng | H04L 12/189 370/312 |
| 2008/0095059 A1* | 4/2008 | Chu | H04L 12/66 370/238 |

* cited by examiner

*Primary Examiner* — Kodzovi Acolatse
(74) *Attorney, Agent, or Firm* — Mark Stallion; Husch Blackwell LLP

(57) ABSTRACT

The present technology comprises a method and apparatus for a routing protocol for a router including an apparatus and method for distance vector multicast routing. The method and apparatus as disclosed and claimed offers a new interpretation of the routing information stored in a DVMRP routing table. This interpretation relates to the knowledge of the locations of a multicast source router and the routers connected to hosts with group members in a DVMRP domain. The methodology exploits this knowledge to create two conditional packet forwarding checks, based on pseudo-diameter and super-pseudo-diameter respectively, and used these conditions to extend the two phases of the existing DVMRP to improve its performance from the viewpoint of much better utilization of bandwidth.

14 Claims, 15 Drawing Sheets

Truncated Broadcast Tree Formation With RPF Check, Poison Reverse, and Pseudo-Diameter

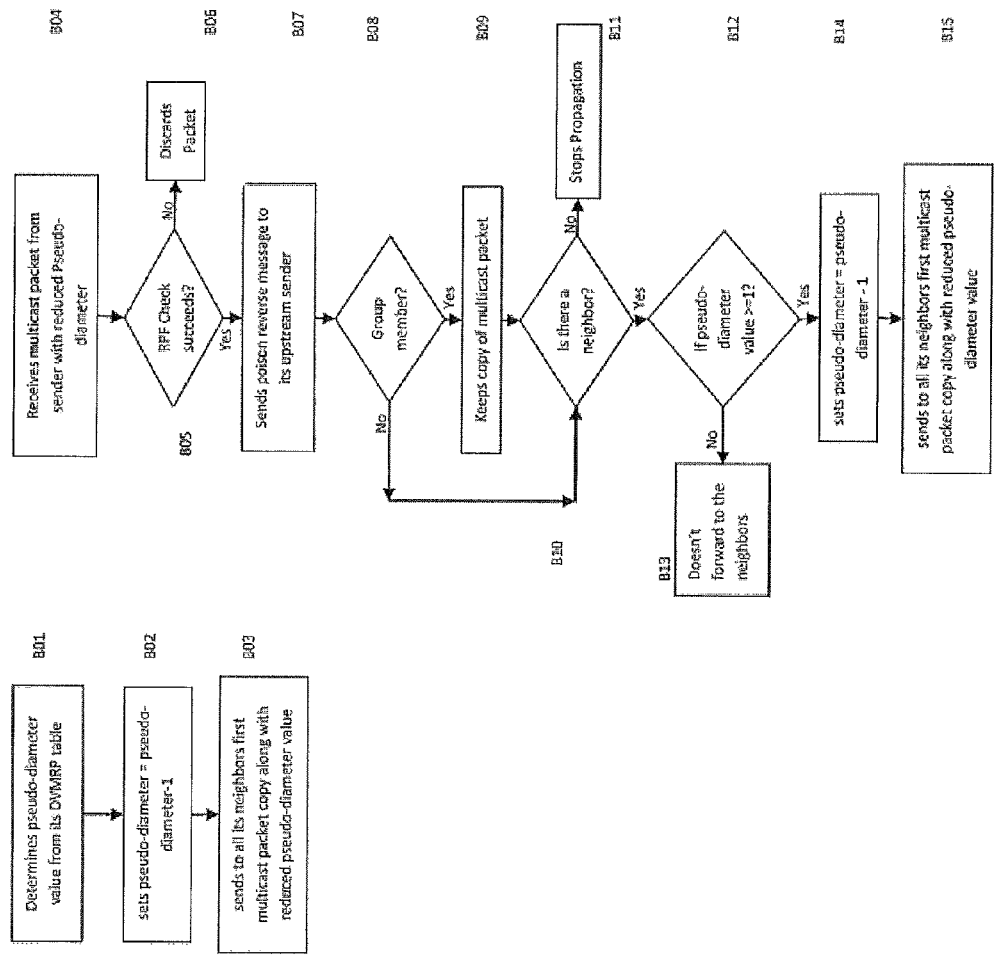
Fig. 1 Creation of Truncated Broadcast Tree

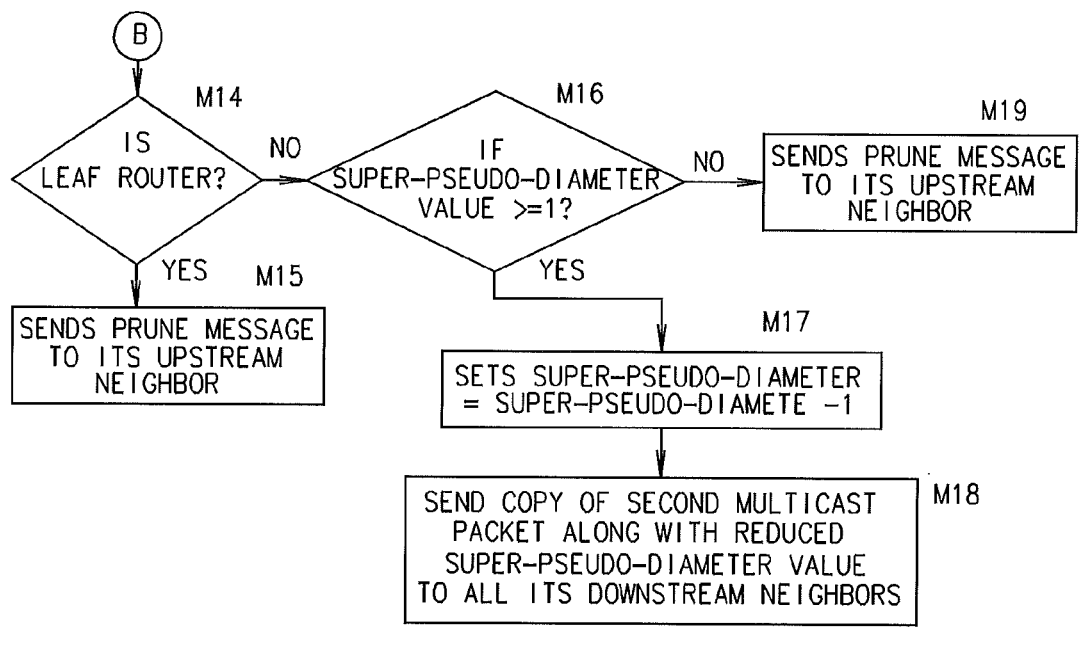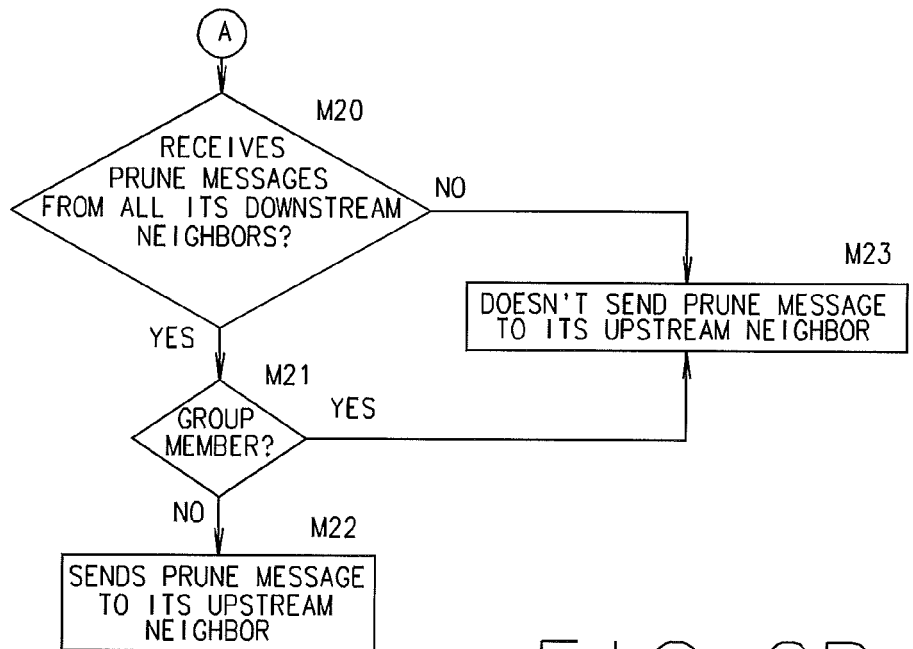
FIG. 2B

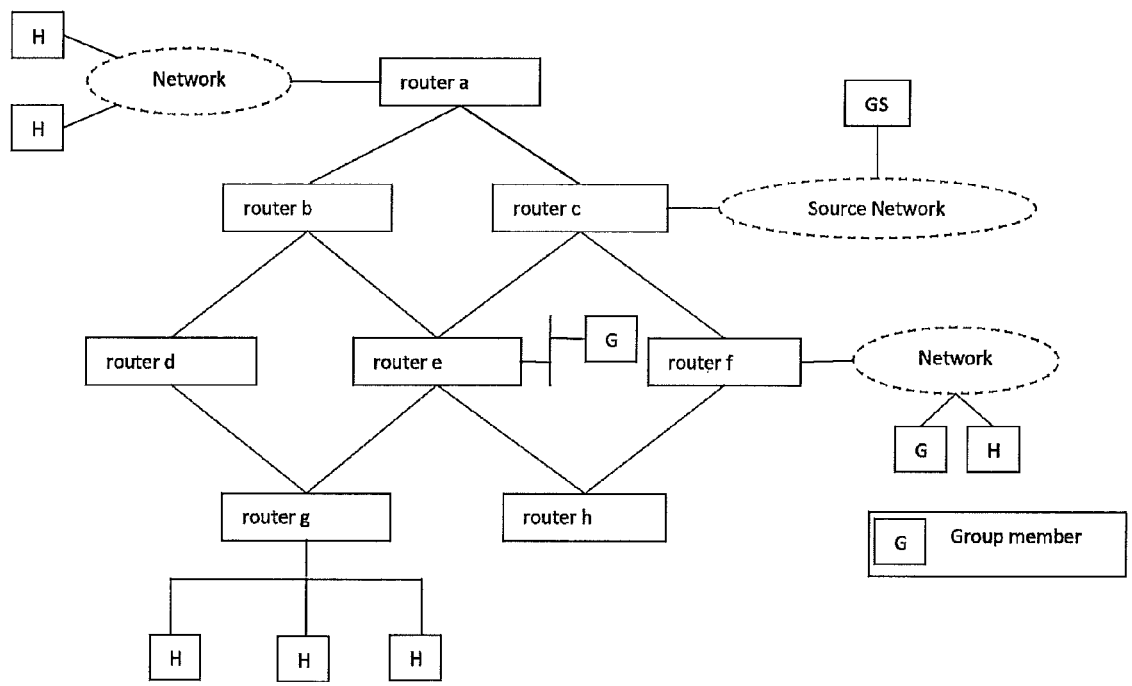
Fig. 3 An Example DVMRP Domain with Diameter 4

| a | | |
|---|---|---|
| Dest. | Next | hops |
| a | a | 0 |
| b | b | 1 |
| c | c | 1 |
| d | b | 2 |
| e | b | 2 |
| f | c | 2 |
| g | b | 3 |
| h | b | 3 |
| b | | |
|---|---|---|
| Dest. | Next | hops |
| a | a | 1 |
| b | b | 0 |
| c | a | 2 |
| d | d | 1 |
| e | e | 1 |
| f | a | 3 |
| g | d | 2 |
| h | e | 2 |
| c | | |
|---|---|---|
| Dest. | Next | hops |
| a | a | 1 |
| b | a | 2 |
| c | c | 0 |
| d | a | 3 |
| e | e | 1 |
| f | f | 1 |
| g | e | 2 |
| h | e | 2 |
| d | | |
|---|---|---|
| Dest. | Next | hops |
| a | b | 2 |
| b | b | 1 |
| c | b | 3 |
| d | d | 0 |
| e | b | 2 |
| f | b | 4 |
| g | g | 1 |
| h | b | 3 |
| g | | |
|---|---|---|
| Dest. | Next | hops |
| a | d | 3 |
| b | d | 2 |
| c | e | 2 |
| d | d | 1 |
| e | e | 1 |
| f | e | 3 |
| g | g | 0 |
| h | e | 2 |
Fig. 4 DVMRP Routing Tables of Routers a, b, c, d, and g
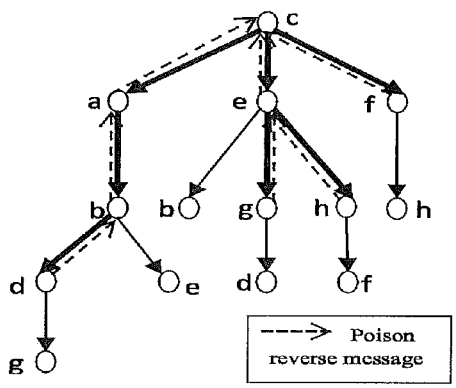
Fig. 5 DVMRP Truncated Broadcast Tree Formation With RPF Check and Poison Reverse

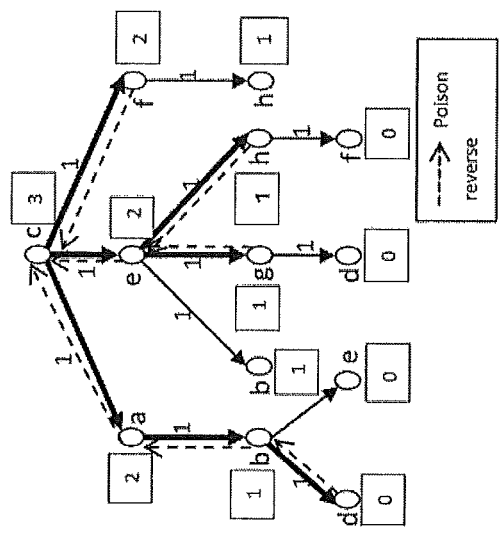
Fig. 6 Truncated Broadcast Tree Formation With RPF Check, Poison Reverse, and Pseudo-Diameter

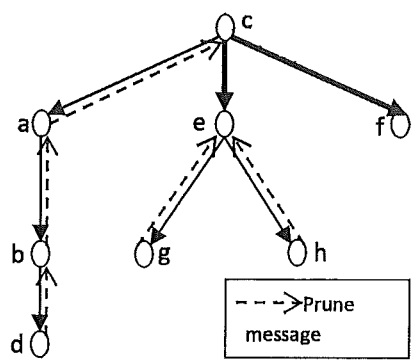
Fig. 7 DVMRP Based Pruned Multicast Tree
| c | | |
|---|---|---|
| Dest | Next | hops |
| e | e | 1 |
| f | f | 1 |
Fig. 8 Sub-DVMRP Table of Router c

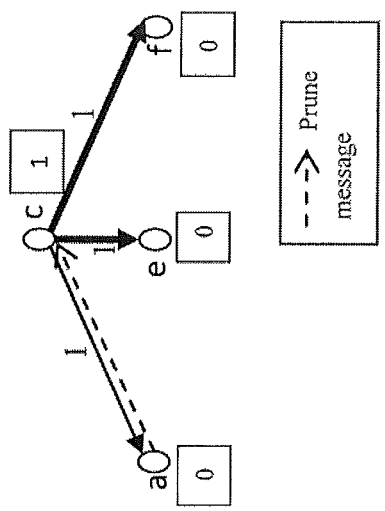
Fig. 9 Super-Pseudo-Diameter Based Pruned Multicast Tree

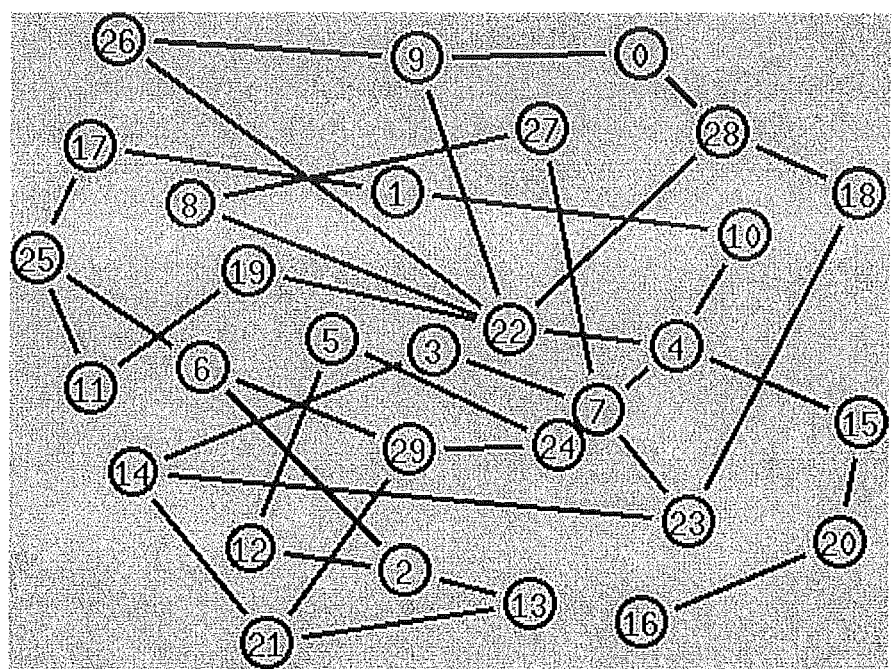
Fig. 10 Thirty Router DVMRP Domain

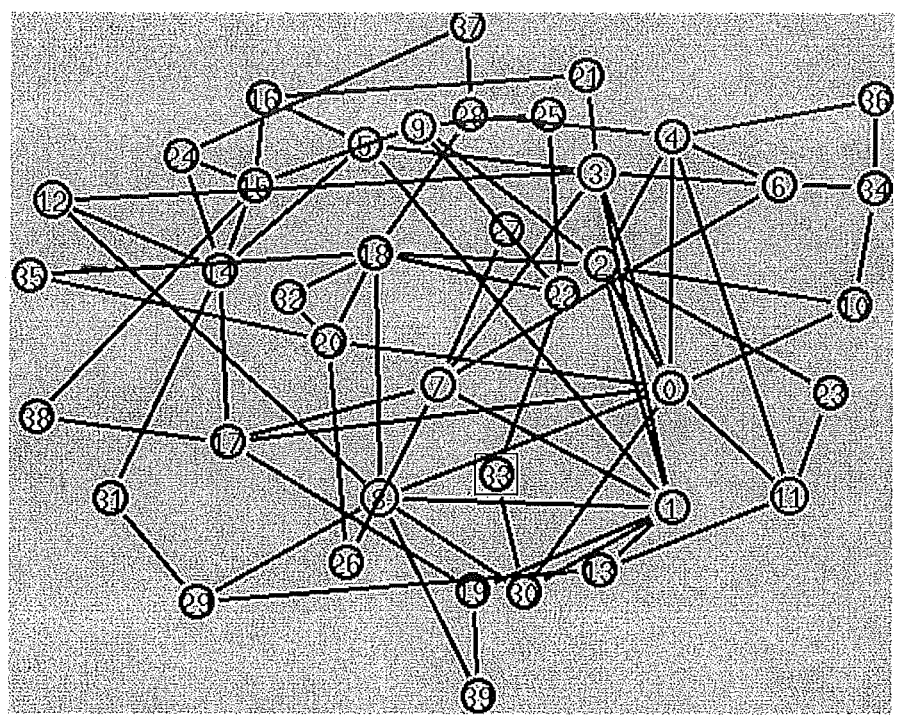
Fig. 11 Forty Router DVMRP Domain

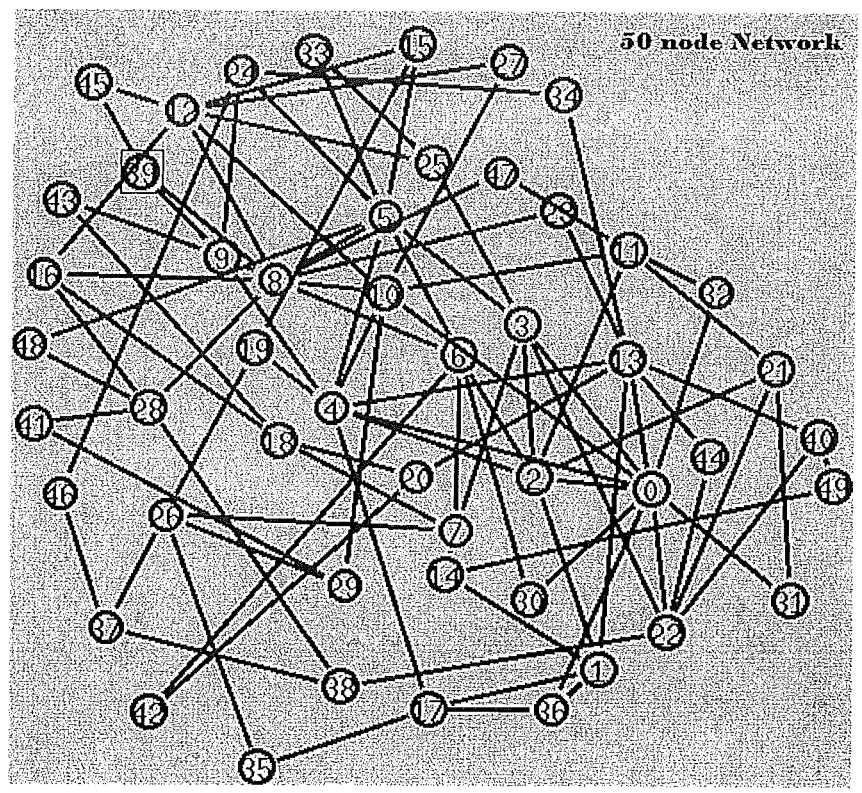
Fig. 12 Fifty Router DVMRP Domain

| 30 Router Network | | | |
|---|---|---|---|
| Multicast Messages | DVMRP | Pd | Super Pd |
| 10 | 25697 | 16698 | 10276 |
| 20 | 51698 | 32564 | 20159 |
| 30 | 78945 | 48942 | 32365 |
| 40 | 103265 | 66086 | 39238 |
| 50 | 128974 | 79961 | 51588 |

Fig. 13 Average number of packets generated for 30 Router DVMRP Domain

| 40 Router Network | | | |
|---|---|---|---|
| Multicast Messages | DVMRP | Pd | Super Pd |
| 10 | 57861 | 38187 | 21986 |
| 20 | 117834 | 73057 | 48311 |
| 30 | 176357 | 114627 | 68776 |
| 40 | 232425 | 144103 | 92968 |
| 50 | 287145 | 183769 | 109113 |

Fig. 14 Average Number Of Packets Generated For 40 Router DVMRP Domain

| 50 Router Network | | | |
|---|---|---|---|
| Multicast Messages | DVMRP | Pd | Super Pd |
| 10 | 98352 | 63927 | 39340 |
| 20 | 195896 | 123410 | 80314 |
| 30 | 296967 | 187084 | 115814 |
| 40 | 397056 | 246171 | 158821 |
| 50 | 498923 | 319308 | 189589 |
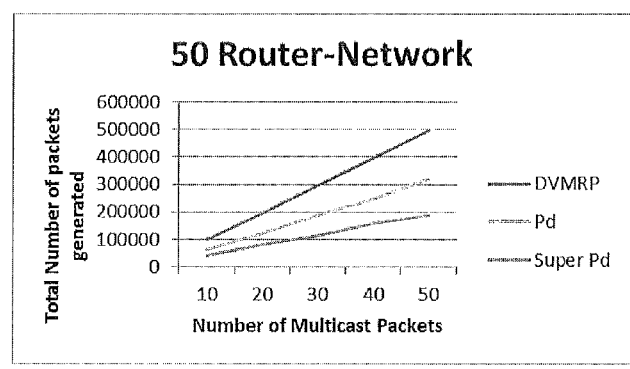
FIG. 15A                           FIG. 15B
Fig. 15 Average Number Of Packets Generated For 50 Router DVMRP Domain

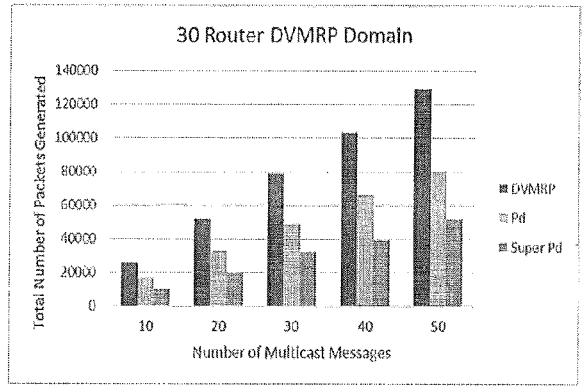
Fig. 16 Average Number Of Packets Generated For 30 Router DVMRP Domain
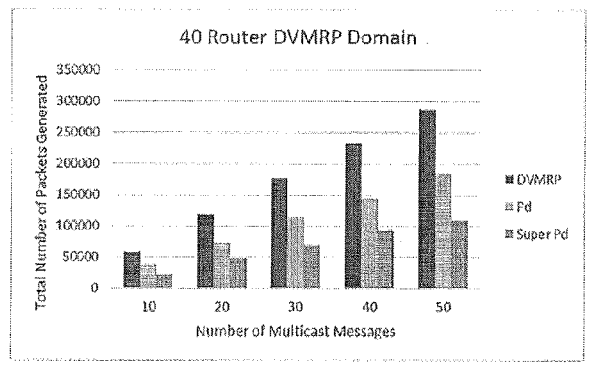
Fig. 17 Average Number Of Packets Generated For 40 Router DVMRP Domain
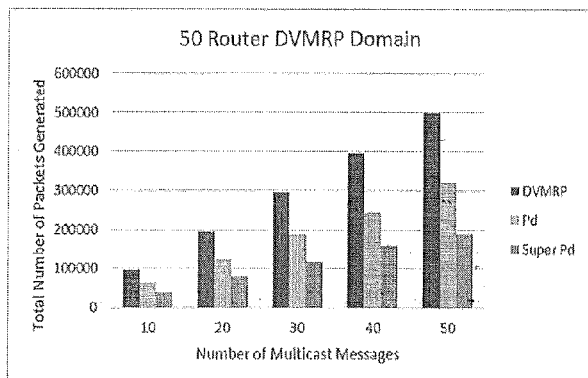
Fig. 18 Average Number Of Packets Generated For 50 Router DVMRP Domain

MULTICAST ROUTING PROTOCOL FOR COMPUTER NETWORKS

CROSS REFERENCE

This application claims priority to and the benefit of U.S. Provisional Patent Application Ser. No. 61/858,409 entitled Multicast Routing Protocol For Computer Networks filed Jul. 25, 2013, which is hereby incorporated by reference in its entirety.

BACKGROUND

1. Field

This technology relates generally to routing protocol and, more particularly, to routing protocol for computer networks.

2. Background Art

In computer communication theory relating to packet-switched networks, a distance-vector routing protocol is one of the two major classes of routing protocols, the other major class being the link-state protocol. Distance-vector routing protocols use the Bellman-Ford algorithm, Ford-Fulkerson algorithm to calculate paths. A distance-vector routing protocol requires that a router informs its neighbours of topology changes periodically. Compared to link-state protocols, which require a router to inform all the nodes in a network of topology changes, distance-vector routing protocols have less computational complexity and message overhead. The term distance vector refers to the fact that the protocol manipulates vectors (arrays) of distances to other nodes in the network. Examples of distance-vector routing protocols include RIPv1 and RIPv2 and IGRP. Distance-vector protocols are based on calculating the direction and distance to any link in a network. "Direction" usually means the next hop address and the exit interface. "Distance" is a measure of the cost to reach a certain node. The least cost route between any two nodes is the route with minimum distance. Each node maintains a vector (table) of minimum distance to every node. The cost of reaching a destination is calculated using various route metrics. RIP uses the hop count of the destination whereas IGRP takes into account other information such as node delay and available bandwidth. Updates are performed periodically in a distance-vector protocol where all or part of a router's routing table is sent to all its neighbors that are configured to use the same distance-vector routing protocol. Once a router has this information it is able to amend its own routing table to reflect the changes and then inform its neighbors of the changes. This process has been described as 'routing by rumor' because routers are relying on the information they receive from other routers and cannot determine if the information is actually valid and true. There are a number of features which can be used to help with instability and inaccurate routing information.

Distance Vector protocols view networks in terms of adjacent routers and hop counts, which also happens to be the metric used. The "hop" count (max of 15 for RIP, 16 is deemed unreachable and 255 for IGMP), will increase by one every time the packet transits through a router. So the router makes decisions about the way a packet will travel, based on the amount of hops it takes to reach the destination and if it had 2 different ways to get there, it will simply send it via the shortest path, regardless of the connection speed.

Multicast protocols in computer networks often use information from routers in a network using Distance Vector Routing (DVR) and often run a data propagation mechanism known as Reverse Path Forwarding (RPF) using the DVR information. Multicasting in computer networks means communication among a group of users where formation of the group is based on the particular interest of its members. Some examples are: Video conferencing, social networking, distance learning, communication in battle field, etc. At any given time thousands of such communications are transmitted on networks. One of the most widely used multicast protocols is known as Distance Vector Multicast Routing Protocol (DVMRP), which uses the DVR information from the routers.

For its proper implementation, it generates a very large number of control packets, known as prune packets; these prune packets consume a considerable amount of network bandwidth, which results in slower traffic movement in the networks causing delay in communication. Since transmissions of these packets have to be done by routers, it keeps routers so busy that other communications (i.e., other than multicasting) such as email, file transfer, web browsing etc. which need these routers are affected and get delayed. It may also affect the speed at which an urgent multicast session must complete. In reality thousands of multicasting sessions take place at any given time and therefore in general the overall traffic-load situation is extremely bad from the viewpoint of communication delay and congestion when DVMRP is used.

While this protocol is not hard to implement, much improvement is needed from the viewpoint of more effective use of the network bandwidth by drastically reducing the number of prune packets generated. As pointed out above more effective bandwidth utilization means enhancements of the data communication speed as well as less probable occurrence of congestion in a network. It can therefore make a network more cost-effective.

BRIEF SUMMARY

The technology disclosed and claimed herein is a method and apparatus for a routing protocol for a router including a condition check which performs a pseudo-diameter base check based on and relative to the location of the source router to determine the maximum value to reach all destination routers and further incorporating a packet forwarding condition check during the pruning of the truncated broadcast tree where the condition check is a super-pseudo-diameter based check and whereby the source router having its super-pseudo-diameter as the maximum value among the costs to reach from source to only those routers which are connected to hosts with group members.

In one aspect, the technology as disclosed and claimed herein includes a method for enabling a Distance Vector Multicasting Routing Protocol (DVMRP) router to check a condition before forwarding the packet to any of its neighbors during the creation of the truncated broadcast tree. This condition check is named as pseudo-diameter based check. Pseudo-diameter D of a router X is determined from its DVMRP routing table and it is the maximum value among the costs to reach all destination routers from router X, as present in router X's DVMRP routing table. The implication of pseudo-diameter is that any other router is reachable from router X within the distance equal to the pseudo-diameter of router X. It is not the actual diameter of the DVMRP domain, because it depends on the location of router X in the domain. So, different routers in the domain may have different values for their respective pseudo-diameters.

Therefore, pseudo-diameter D of a router is always less than or equal to the actual diameter of the DVMRP domain.

DVMRP does not consider this location aspect of a multicast source in its packet forwarding mechanism. However, the present technology proposes to use it in the following way. In phase one, the technology as disclosed and claimed reduces the number of duplicate packets which are generated during broadcasting. It is possible only if the scope of travel of the first packet can be reduced. The various implementations of the method and system disclosed and claimed herein achieves this by using the pseudo-diameter of the multicast source to control packet propagation during broadcasting instead of using the domain diameter. Therefore, pseudo-diameter of the multicast source becomes the scope of travel. In reality, for many routers their respective pseudo-diameters will be less than the domain diameter. Hence in the proposed modified phase one the number of duplicate packets generated during broadcasting will be much less than that in DVMRP in many cases. So effectively, in phase one the technology disclosed and claimed incorporates a pseudo-diameter based conditional forwarding of copies of the first packet by a router during broadcasting. It is important to note that for incorporating this location aspect in packet forwarding, there is no need to alter/modify the mechanism used by DVMRP for poison reverse route advertisements. So it remains same.

In another aspect, the technology features a method and system to reduce drastically the number of prune packets generated by incorporating a packet forwarding condition check during the pruning of the truncated broadcast tree. This condition check is named as super-pseudo-diameter based check. For a source router X, its super-pseudo-diameter is the maximum value among the costs to reach from source X only those routers which are connected to hosts with group members. This information is collected from the source router's DVMRP routing table. Super-pseudo-diameter of a router is always less than or equal to its pseudo-diameter, since the router computes the value of its super-pseudo-diameter from a subset of the routers in its DVMRP routing table. Hence, it is very likely that super-pseudo-diameter will be less than the domain diameter most of the time. So packet forwarding based on this check can help in avoiding the traversal of the whole truncated broadcast tree for pruning purpose. This location aspect of the routers is not considered in the design of DVMRP. Rather it uses a flood-and-prune mechanism. That is why in DVMRP the whole truncated broadcast tree needs to be traversed for pruning irrespective of the locations of the multicast source and the routers connected to group members. The present technology propose to modify phase two such that during the creation of the pruned tree from the truncated broadcast tree, a source router X will use its super-pseudo-diameter value to limit the travelling distance (number of hops) of any copy of the packet. So effectively it further reduces the scope of travel for the second multicast packet resulting in the generation of much less prune packets than DVMRP. That is, the whole truncated broadcast tree may not need to be traversed for pruning purpose most of the time unlike in existing DVMRP. To summarize, if the two phases of existing DVMRP are extended as proposed here, much improved bandwidth utilization can be achieved from the viewpoint of much less number of both duplicate and prune packets generated. This improvement of bandwidth utilization can play a significant role in improving network performance as well particularly when many concurrent multicast sessions take place in the same DVMRP domain.

These and other advantageous features of the present invention will be in part apparent and in part pointed out herein below.

BRIEF DESCRIPTION OF THE DRAWINGS

For a better understanding of the present invention, reference may be made to the accompanying drawings in which:

FIG. 1 is a flow of the Creation of Truncated Broadcast Tree;

FIG. 2B is a flow of Pruning The Truncated Broadcast Tree (Cont'd . . . );

FIG. 3 is a diagram of An Example DVMRP Domain with Diameter 4;

FIG. 4 is an illustration of DVMRP Routing Tables of Routers a, b, c, d, and g;

FIG. 5 is an illustration of DVMRP Truncated Broadcast Tree Formation With RPF Check and Poison Reverse;

FIG. 6 is Truncated Broadcast Tree Formation With RPF Check, Poison Reverse, and Pseudo-Diameter;

FIG. 7 is DVMRP Based Pruned Multicast Tree;

FIG. 8 is a Sub-DVMRP Table of Router c;

FIG. 9 is a Super-Pseudo-Diameter Based Pruned Multicast Tree;

FIG. 10 is an illustrations of a Thirty Node Network;

FIG. 11 is an illustration of a Forty Node Network;

FIG. 12 illustrates of a Fifty Node Network;

FIG. 15A is a table that illustrates the Average Number Of Packets Generated For 50 Node Networks;

FIG. 15B is a graph illustrating the total number of packets generated for 50 node networks FIG. 16 illustrates the Average Number Of Packets Generated For 30 Node Networks;

FIG. 17 illustrates the Average Number Of Packets Generated For 40 Node Networks; and FIG. 18 illustrates the Average Number Of Packets Generated For 50 Node Networks.

Figure 2A:
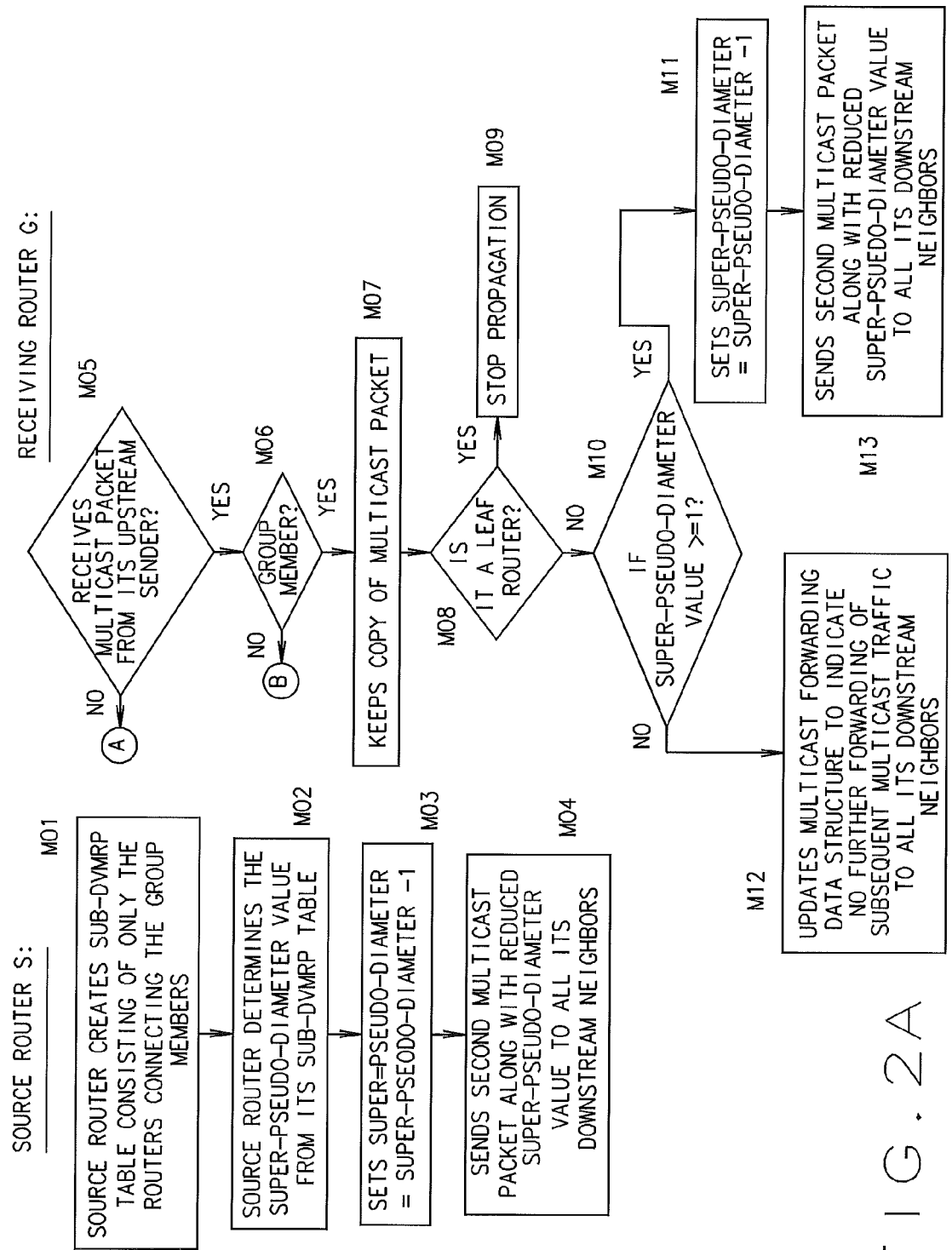
FIG. 2A is a flow of the Pruning The Truncated Broadcast Tree.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF INVENTION

According to the embodiment(s) of the present invention, various views are illustrated in FIG. 1-18 and like reference numerals are being used consistently throughout to refer to like and corresponding parts of the invention for all of the various views and figures of the drawing. Also, please note that the first digit(s) of the reference number for a given item or part of the invention should correspond to the Fig. number in which the item or part is first identified.

One embodiment of the present technology comprising a method and apparatus for a routing protocol for a router teaches a novel apparatus and method for distance vector multicasting routing. The method and apparatus as disclosed and claimed offers a very meaningful and important new interpretation of the routing information stored in a DVMRP routing table. This interpretation relates to the knowledge of the locations of a multicast source router and the routers connected to hosts with group members in a DVMRP domain. The methodology exploits this knowledge to create two conditional packet forwarding checks, based on pseudo-diameter and super-pseudo-diameter respectively, and used these conditions to extend the two phases of the existing DVMRP to improve its performance from the viewpoint of much better utilization of bandwidth. It may be noted that DVMRP does not consider incorporation of any such knowledge in its packet forwarding mechanisms while creating a truncated broadcast tree as well as its corresponding pruned tree.

Distance Vector Multicast Routing Protocol (DVMRP) is a widely used multicast routing protocol in computer networks. This protocol first creates a truncated broadcast tree by using RPF check and next it creates a pruned multicast tree. This RPF check is performed by a receiving router using the information present in the router's DVMRP routing table. For packet forwarding a router does it unconditionally to all its neighbors except the one from which it receives the packet. While creating the broadcast tree, diameter of the DVMRP domain is used to control packet propagation. DVMRP uses a flood-and-prune mechanism to create the pruned multicast tree. As a result, the whole truncated broadcast tree can be traversed for creating the pruned tree. The technology as disclosed and/or claimed herein in its various implementations provides a method and system whereby if location of the multicast source router as well as locations of the routers connected to hosts with group members in the related DVMRP domain are considered while forwarding a packet during the creation of both truncated broadcast tree and pruned tree, considerable improvement of the bandwidth utilization can be achieved from the viewpoint of much less number of both duplicate and prune packets generated. In reality, this improvement of bandwidth utilization may play a significant role in improving network performance as well particularly when many concurrent multicast sessions take place in the same DVMRP domain. Standard DVMRP does not consider this location aspect.

There is a need to enhance the existing DVMRP to achieve improved utilization of network bandwidth. In the present technology, a new interpretation of the routing information present in DVMRP routing tables is given; this interpretation relates to the locations of the routers mentioned above in a DVMRP domain. In this technology is incorporated this location aspect of the routers in existing DVMRP and this technology achieves much improved bandwidth utilization as compared to standard DVMRP.

The details of the invention and various embodiments can be better understood by referring to the figures of the drawing. DVMRP uses an on-demand approach for multicasting traffic from a multicast source. It works in two phases. In phase one, a truncated broadcast tree is created by broadcasting the first packet from a multicast source. It uses the diameter of the DVMRP domain to control packet propagation (i.e. to control broadcasting). That is, the domain diameter defines the scope of travel of a packet during the creation of the broadcast tree. In phase two, propagation of the second multicast packet helps in pruning the truncated broadcast tree to cause efficient multicasting. Because of the use of a flood-and-prune mechanism the whole broadcast tree can be traversed to create the pruned multicast tree. All subsequent packets follow the pruned tree during their propagation.

DVMRP does not consider the location aspect of the source in a DVMRP domain during broadcasting and pruning. It also does not consider during pruning the location aspect of the routers that are directly connected to hosts attached to group members. In the present invention we incorporate this location aspect in our proposed enhancement of DVMRP. To do so, the present technology gives a new and very important interpretation of the information present in the DVMRP tables of the routers. This interpretation has resulted in two concepts, viz., pseudo-diameter and super-pseudo-diameter. These two concepts are directly related to the physical locations of a multicast source as well as the locations of the routers connected to hosts with group members in a DVMRP domain. Based on these two concepts the method incorporates in the existing DVMRP two simple packet forwarding conditions to be checked by each receiving router before further forwarding, one during the formation of the broadcast tree and the other during the formation of the pruned tree. This enhanced DVMRP will offer much improved utilization of network bandwidth via considerable reduction in the number of both duplicate and prune packets generated. In reality, this improvement of bandwidth utilization may play a significant role in improving network performance as well particularly when many concurrent multicast sessions take place in the same DVMRP domain.

Pseudo-diameter, D of a router X is determined from its DVMRP table and it is the maximum value among the costs (i.e. number of hops) to reach all destination routers from router X, as present in router X's DVMRP routing table. The implication of pseudo-diameter is that any other router is reachable from router X within the distance equal to the pseudo-diameter of router X. It thus directly relates to the physical location of router X. It is not the actual diameter of the DVMRP domain, because it depends on the location of router X in the domain. So, different routers in the domain may have different values for their respective pseudo-diameters. Therefore, pseudo-diameter D is always less than or equal to the actual diameter of the DVMRP domain. DVMRP does not consider this location aspect of a multicast source in its packet forwarding mechanism.

In phase one, the objective is to reduce the number of duplicate packets which are generated during broadcasting; It is possible only if the scope of travel of the first packet used in DVMRP is reduced. This is achieved by using the pseudo-diameter of the multicast source to control packet propagation during broadcasting instead of using the domain diameter. So pseudo-diameter of the multicast source becomes the scope of travel. In reality, for many routers their respective pseudo-diameters will be less than the domain diameter. Hence in the proposed modified phase one the number of duplicate packets generated during broadcasting will be much less than that in DVMRP in many multicast sessions. So effectively, in phase one the method incorporates a pseudo-diameter based conditional forwarding of copies of the first packet by a router during broadcasting. It is important to note that for incorporating this location aspect in packet forwarding, there is no need to alter/modify the mechanism used by DVMRP for poison reverse route advertisements. So it remains same.

For a multicast source router X, its super-pseudo-diameter is the maximum value among the costs (in number of hops) to reach from source. X only those routers which are connected to hosts with group members. This information is collected from the source router's DVMRP routing table.

Super-pseudo-diameter of a router is always less than or equal to its pseudo-diameter, since the router computes the value of its super-pseudo-diameter from a subset of the routers in its DVMRP routing table. Hence, it is very likely that super-pseudo-diameter will be less than the domain diameter most of the time. The method proposes that during the creation of the pruned tree from the truncated broadcast tree, a packet forwarding condition check based on the super-pseudo-diameter of a source router X be performed by each router before further forwarding. Effectively the DVMRP can be enhanced so that it uses the super-pseudo-diameter value of a multicast source to limit the travelling distance of any copy of the second packet during the creation of the pruned tree. It is suggested that the whole truncated broadcast tree need not be traversed to create the pruned tree unlike in existing DVMRP. So in effect it further reduces the scope of travel for the packet resulting in the generation of much less prune packets than DVMRP.

Hence, if the two phases of existing DVMRP are extended as proposed here, much improved bandwidth utilization can be achieved from the viewpoint of much less number of both duplicate and prune packets generated. This improvement of bandwidth utilization may play a significant role in improving network performance as well particularly when many concurrent multicast sessions take place in the same DVMRP domain.

Referring to the Figures, the proposed enhanced DVMRP is illustrated as to how it should work using flow charts. The flow charts of the two phases of the proposed protocol are presented in FIG. 1 and FIG. 2 respectively. FIG. 1 shows the different steps of the process of generating the truncated broadcast tree (Phase I). An on-demand approach is used to create the tree, because it can save considerable memory in the routers. FIG. 2 shows the generation of the pruned tree from the broadcast tree (Phase II). It is assumed that a router sends its network address to the multicast source as soon as a host connected to it joins the multicast group.

Phase I: Generation of Truncated Broadcast Tree Using Pseudo-Diameter.

In FIG. 1 the source router determines its pseudo-diameter value from its DVMRP routing table (B01) and uses it in the following way to control broadcasting instead of using the actual diameter of a DVMRP domain as is currently being used. It reduces the pseudo-diameter value by one hop (B02) and forwards the first packet to each neighbor along with the reduced pseudo-diameter value (B03).

As in DVMRP, a receiving router performs RPF check (B05) first to see if the packet has come along the best path. If the check fails, it discards the packet (B06); otherwise it sends a poison reverse message to its sender (B07). It means that this receiving router is a downstream neighbor of the sender. If it is a group member (B08), it keeps a copy of the packet (B09). Whether a group member or not, it then checks if it has any neighbor (B10). If not, packet propagation discontinues (B11). Otherwise, it checks if the received reduced pseudo-diameter value is equal to the cost to reach its neighbor (i.e. 1 hop) or larger than 1 (B12). If not, it stops forwarding (B13). Otherwise, it reduces the received pseudo-diameter value by one hop (B14) and forwards the packet along with the newly reduced pseudo-diameter value to the neighbors except to its upstream neighbor (B15). In this way, packet forwarding continues creating the branches of the tree. Result is the truncated broadcast tree rooted at the multicast source.

Phase II: Generation of Pruned Tree Using Super-Pseudo-Diameter:

In FIG. 2 source router creates the Sub-DVMRP routing table from its DVMRP routing table (M01). This table consists of only the entries in the DVMRP table corresponding to the routers connected to hosts attached to group members. It then determines the super-pseudo-diameter (M02) and reduces its value by one hop (M03) and forwards the second packet along with the reduced super-pseudo-diameter value to its neighbors (M04).

A receiving downstream router keeps a copy to itself (M07) if it is a group member (M06). If it is a leaf router (M08), it stops propagating the packet further (M09). Otherwise it checks if the received reduced super-pseudo-diameter value is equal to the cost to reach the neighbor (i.e. 1 hop) or larger than 1 (M10); if so, it reduces the received super-pseudo-diameter value by one hop (M11) and forwards the packet along with the newly reduced super-pseudo-diameter value to its downstream neighbors (M13); otherwise it does not forward copies of the packet to these neighbors and it updates its forwarding data structure to indicate that subsequent multicast packets will not be forwarded to these downstream neighbors (M12).

If the receiving downstream router is not a group member and it is a leaf router, it sends a prune message (packet) to its upstream sender (M15). Otherwise, it checks if the received super-pseudo-diameter value is equal to 1 or larger than 1 (M16). If not, it sends a prune message to its upstream sender (M19). Otherwise it reduces the received super-pseudo-diameter value by 1 (M17) and sends copy of the packet along with this newly reduced super-pseudo-diameter value to each of its downstream neighbors (M18).

If a node receives prune messages from all its downstream neighbors (M20) and if it is not a group member, it sends a prune message to its upstream sender (M22). If it is a group member, it does not send a prune message to its upstream sender (M23). If it has not received prune messages from all its downstream neighbors, it does not send a prune message to its upstream sender (M23). In this way packet forwarding continues. Result is the pruned multicast tree rooted at the multicast source. All subsequent multicast packets will follow this tree to reach the group members.

Contribution in Phase I: As is clear from FIG. 1, the purpose of using the source router's pseudo-diameter value for packet propagation is to limit the maximum travel distance of the first packet; that is, to reduce the scope of travel of the first packet during broadcasting compared to that in DVMRP. In other words, incorporation of the location aspect of a source router may help in the reduction of the scope of travel, resulting in the generation of less duplicate packets compared to DVMRP. However, for incorporating this location aspect in packet forwarding, there is no need to alter/modify the mechanism used by DVMRP for poison reverse route advertisements. So it remains the same.

Pseudo-diameter value of any source in a DVMRP domain is always less than or equal to the actual diameter of the domain, therefore the scope of travel of the first packet in our approach is either less or at most equal to that of DVMRP depending on the location of the source router. In reality it is quite likely that for many routers in a DVMRP domain, their respective pseudo-diameter values will be less than the actual diameter of the domain. As a result, in many multicast sessions our approach will generate less number of duplicate packets.

Contribution in Phase II: In existing DVMRP during pruning, there is no condition check by an upstream router before it forwards copies of the second packet to its downstream neighbors. It just uses a flood-and-prune mechanism. Hence in DVMRP the whole truncated broadcast tree needs to be traversed to create the corresponding pruned tree.

In the proposed extension of this phase, the method uses the fact that since super-pseudo-diameter of a multicast source router is always less than or equal to its pseudo-diameter in a DVMRP domain, therefore it may not be necessary to traverse the whole truncated broadcast tree created based on the pseudo-diameter value for pruning purpose. How far to travel, does actually depend on the super-pseudo-diameter value of a multicast source. So use of the super-pseudo-diameter value effectively limits the travelling distance of any copy of the packet during the creation of the pruned tree. So in effect it further reduces the scope of travel for the second multicast packet resulting in the generation of much less number of prune packets compared to DVMRP.

Therefore, considering the improvements in both phases, it is clearly understood that the extended DVMRP as suggested in this invention will offer much improved bandwidth utilization.

Some of the noteworthy points of the invention are as follows:
the approach uses the same routing information present in the DVMRP routing tables, but with a different interpretation of the routing information; this interpretation relates to the location aspect of the source router as well as the routers connected to hosts with group members. The method has incorporated this location aspect in existing DVMRP.

There is no need to change any infrastructure or hardware. All that is needed is that a router sends its network address to the multicast source as soon as a host connected to it joins the multicast group.

The present technology if applied to DVMRP as suggested may play a significant role in improving network performance in particular when many concurrent multicast sessions take place in the same DVMRP domain.

It is assumed that a router sends its network address to the multicast source as soon as a host connected to it joins the multicast group.

FIG. 1 Illustrates PHASE I:

Generation of Truncated Broadcast Tree Using Pseudo-Diameter; and PHASE II: Generation of Pruned Multicast Tree Using Super-Pseudo-Diameter. Let us consider the example network of FIG. 3. Without any loss of generality let us assume that group members are connected to the routers e and f, and the multicast source is connected to router c. FIG. 4 shows the corresponding DVMRP routing tables for the routers a, b, c, d, and g.

PHASE I: Creation of Truncated Broadcast Tree: FIG. 5 shows the working of DVMRP-based truncated broadcast tree generation. Observe that the packet propagation is controlled by the diameter (=4) of the DVMRP domain as shown in FIG. 3. In addition it also uses unconditional forwarding of packets. The truncated tree is shown by the solid (bold) lines and the poison reverse messages are shown with dotted arrows. Now it can be explained how the proposed extended DVMRP works in Phase I to generate the same truncated broadcast tree. It is shown in FIG. 6.

According to block B01 of FIG. 1, source router determines the pseudo-diameter value from its DVMRP table. In our example network, router c is the source router and it determines its pseudo-diameter value as 3 from its DVMRP table. As shown in block B02 of FIG. 1, router C reduces the pseudo-diameter value to (pseudo-diameter value—1) because the cost to reach any of its neighbors is always 1 hop. So the reduced pseudo-diameter value is now 2. Router c now forwards the first multicast packet with reduced pseudo-diameter value of 2 to all its neighbors a, e, and f (B03).

Poison reverse message: After receiving a copy of the multicast packet from router c with pseudo-diameter 2, router a, first performs RPF check (B05) and the check succeeds. So, router a becomes a downstream neighbor for router c. Hence, router a sends a Poison Reverse message to router c (B07). The poison reverse message from router a to router c is shown with a dotted arrow. This informs router c that router a is a downstream router for this multicast session with router c as the multicast source.

Router a is not a group member (B08). So it now checks to see if it has any neighboring routers (B10). It finds that router b is its neighbor. It now checks to see if it can reach its neighboring router b with its pseudo-diameter value 2 (B12). Router b is 1 hop away from router a. So, router a sets the pseudo-diameter value to 1 (=(2−1))(B14). It forwards the multicast packet along with this reduced pseudo-diameter value to router b (B15). Router b performs RPF check (B05) to see if the packet has arrived along the best path. From its DVMRP table router b determines that router a is its upstream router for the multicast source c. Router b sends Poison Reverse message to router a (B07). This informs router a that router b is its downstream router for this multicast session with router c as the multicast source.

Router b now checks if it is a group member (B08). The check fails. It then checks to see if it has any neighboring routers (B10). It finds that routers d and e are its neighbors. Router b then checks to see if it can reach its neighbors d and e with its pseudo-diameter value 1 (B12). Routers d and e are 1 hop away from router b. So, router b sets the pseudo-diameter value to 0 (=(1−1))(B14). It then forwards the multicast packet along with the reduced pseudo-diameter value of 0 to routers d and e (B15).

Router d performs RPF check (B05) to see if the packet has arrived along the best path. From its DVMRP table router d determines that router b is its upstream router for the multicast source c. So, router d sends Poison Reverse message to router b (B07). This informs router b that router d is a downstream router for this multicast session with router c as the multicast source. Router d is not a group member (B08) and it has a neighboring router g (B10). Router g is 1 hop away from router d. But, router d has pseudo-diameter value of 0. So it fails the pseudo-diameter condition check (B12). So, router d does not forward the copy to router g. Router e's RPF check fails (B05). So, router e discards the multicast packet (B06).

After receiving the packet from router c routers e and f on the other hand find their RPF checks succeed (B05). So they send Poison Reverse messages to source c (B07). Also they are group members (B08). Therefore, they each keep a copy of the packet. And further forwarding of the packet continues according to the flow chart. The truncated broadcast tree is shown by solid (bold) lines. Observe that packet propagation has been controlled by the pseudo-diameter (=3) of router c.

Comparing FIG. 5 and FIG. 6 it is observed that in DVMRP, router d forwards a copy to router g since packet forwarding is controlled by the domain diameter (=4) which is also the scope of travel used for packet propagation in DVMRP; thus creating one more duplicate packet. This is not the case in FIG. 6 because here the scope of travel is the pseudo-diameter 3 of the source router c and this scope of travel is less than the scope of travel 4 used in DVMRP. Therefore, a prior pseudo-diameter based condition check prohibits router d from forwarding the packet further to router g thus avoiding the creation of the extra duplicate packet.

PHASE II: Creation of Pruned Multicast Tree: In FIG. 7, DVMRP based pruned multicast tree formation is shown. Routers a and e forward copies of the second multicast packet to their downstream neighbors unconditionally as shown. Also since the diameter of the DVMRP domain is 4, propagation continues from router b to its downstream router d in the truncated broadcast tree. As shown in the figure prune messages are sent by the corresponding downstream neighbors indicating absence of any group member. FIG. 8 shows the sub-DVMRP table of source router c; it contains only the routers connecting the group members (M01). Router c determines the super-pseudo-diameter value from this sub-DVMRP table as 1 (M02). In FIG. 9, router c sets the super-pseudo-diameter value to 0 (=1−1) (M03). Router c now sends the multicast packet along with this reduced super-pseudo-diameter value of 0 to all its neighboring routers a, e, and f (M04).

Router a, upon receipt of the multicast packet and the reduced super-pseudo-diameter value of 0 from router c, checks to see if it has a group member (M06) connected to it. It does not have any hosts that are group members. According to block (M14) of FIG. 2, it then checks to see if it is a leaf router. It is not a leaf router as it has downstream router b connected to it. Now it checks to see if the super-pseudo-diameter condition is satisfied (M16). Router b is 1 hop away from router a. This means that router a cannot reach its neighbor router b because its received super-pseudo-diameter is 0. So, super-pseudo-diameter check (M16) fails. Therefore, router a sends a prune message to router c (M19) indicating that it is no longer interested in receiving any multicast packets from the multicast source router c as it is not a group member and it cannot reach any other neighbors as well. In FIG. 9, this prune message is indicated with a dotted arrow from router a to router c.

Router e upon receipt of the multicast packet and the reduced super-pseudo-diameter value of 0 from router c checks to see if it has any group members connected to it (M06). Router e has a host who is a group member; so it keeps a copy of the multicast packet (M07). Router e is not a leaf router [M08] as routers g and h are its downstream routers. So it performs super-pseudo-diameter check to see if it can reach its neighbors with its super-pseudo-diameter value of 0. But routers g and h are 1 hop away from router e. So, super-pseudo-diameter check fails (M10). Then router e updates its multicast forwarding data structure to indicate no further forwarding of subsequent multicast traffic to these two downstream neighbors g and h (M12).

Router f upon receipt of the multicast packet and the reduced super-pseudo-diameter value of 0 from router c checks to see if it has any group member connected to it (M06). It does have and so it keeps a copy of the multicast packet (M07). However router f is a leaf router (M08) of the truncated broadcast tree. So router f stops propagation of the multicast packet further. The multicast pruned tree is shown with solid (bold) lines in FIG. 9.

Observe that in the approach, as disclosed and claimed herein, the whole truncated broadcast tree was not traversed for creating the pruned multicast tree, which is not the case in DVMRP as is evident from FIG. 7. The reason is that we have reduced the scope of travel of the second multicast packet to 1 only. In other words, absence of a conditional forwarding in DVMRP has caused 5 prune messages (packets); On the other hand, in our proposed extension a simple forwarding check based on super-pseudo-diameter has resulted in only one prune message. It is obvious that for a larger DVMRP domain these differences in the number of prune as well as duplicate packets generated by DVMRP and our proposed extended DVMRP is expected to increase and hence our approach will result in a much improved utilization of network bandwidth than DVMRP.

The technology and its various implementations described and claimed herein introduces a unique approach to design a highly efficient DVR based multicasting protocol. It offers a vast improvement of bandwidth utilization when compared with the existing DVMRP scheme. Therefore, the method and system will contribute to the speed of the data communication in the networks. The same DVR information of the routers can be used as is used by the existing DVMRP scheme; but the technology as disclosed and claimed herein provides a complete new interpretation of the DVR information which has been overlooked so far by the existing methods including DVMRP, which uses RPF for data communication. This whole new interpretation provides drastic reduction in the number of prune packets (control packets) needed for implementation, as a result it has been successfully applied to design a new protocol thus offers a vast improvement of the use of network bandwidth compared to the existing DVMRP scheme. Effectively, disclosed and claimed protocol, to a great extent, avoids the unnecessary propagation of control information unlike DVMRP. Since, at any given time, thousands of multicast communications go on in networks, the method and system if applied in reality by all these concurrent multicast sessions, can tremendously reduce the network-wide prune packets generated and the amount of unnecessary propagation of control information (packets); thereby offering huge benefit resulting from the very effective bandwidth utilization, that further results in enhancement of the network speed for all kinds of data communications.

Secure multicasting is highly needed because multicasting involves only a group of users such that other non-group members cannot have access to the multicast data, e.g., secret communication in battle fields. The proposed protocol is a secure one, which we have designed using much less effort, (i.e., much less amount of information-exchange to achieve security of data when compared to many existing such schemes.

The new approach does not require any changes in the infrastructure or underlying platform or hardware. The method and system can be implemented by programming machine executable software that will be loaded in every router/host machine on the network. It can improve vastly the data communication speed in the different multicast application as well as any kind of network communication. It can help in reducing network congestion which is a huge factor causing communication delay. Improvement of network speed and reduction of congestion help in reducing the cost to use the network from the viewpoint of the network subscribers.

In the following observations we have not used any specific metric to denote the cost between two routers. In reality it can be delay, number of hops etc. Our observations are valid irrespective of any specific metric used Theorem 1: Let $S_i$ be the source and $r_i, r_j, \ldots, r_m$ be the respective reductions in the pseudo-diameter (Pd) of $S_i$ before a data packet arrives at its destination D, then $r_i + r_j + \ldots + r_m \leq Pd$. Proof: When the concept of pseudo-diameter is used for data propagation, the value of Pd is reduced first at the source $S_i$ by an amount $r_i$ which is equal to the cost to its next hop router $n_i$ along the path to D and the source $S_i$ sends the packet along with the reduced Pd value to ni. This process of reduction of the pseudo-diameter value continues in a similar way at all the receiving intermediate routers by the respective costs to their next hop routers along the path to D. Now, Pseudo-diameter Pd implies that the maximum cost to any router from source Si can be at most Pd. Therefore, the cost to router D also can be at most Pd. Hence after all the reductions, the pseudo-diameter value of the packet when it arrives at D is zero, if the cost to D is Pd; otherwise it is some positive value. Therefore, $[Pd-(r_i+r_j+ \ldots +r_m)] \geq 0$. Hence the proof follows.

Theorem 2: Multicasting algorithm based on pseudo-diameter guarantees that each group member in the network receives multicast packets sent by the multicast source.

Proof: Pseudo-diameter Pd of a multicast source implies that the maximum cost to any router in the network from the multicast source can be at most Pd. So, obviously any router attached to a group member will be at most Pd cost away from the source router. Also, following the logic of Theorem 1, the condition '$[Pd-(r_i+r_j+ \ldots +r_m)] \geq 0$' is always satisfied at each router attached to a group member. Therefore, every group member receives each multicast packet sent by the multicast source.

Theorem 3: Multicast algorithm based on super-pseudo-diameter (PdS) guarantees that each router ni attached to a group member in the network receives multicast packets sent by the multicast, source nk.

Proof: Super-pseudo-diameter PdSk of the multicast source nk can also be viewed as the pseudo-diameter of nk with respect to its sub-DVMRP table which contains routing information of the routers attached to group members only. Therefore, by applying the logic used in the proof of Theorem 2, it can be concluded that each router ni attached to a group member can be at most PdSk cost away from the source and therefore it receives each multicast packet sourced at router nk. Hence, each group member receives multicast packets.

Let N(Pd)=number of duplicate and prune packets generated by the multicast algorithm based on pseudo-diameter Pd.

N(PdS)=number of duplicate and prune packets generated by the multicast algorithm based on super-pseudo-diameter PdS N(DVMRP)=number of duplicate and prune packets generated by DVMRP DVMRPD=diameter of DVMRP domain Corollary 1: $DVMRPD \geq Pd \geq PdS$ Theorem 4: $N(PdS) \leq N(Pd)$ Proof: Let router n be the source router. Its $PdS \leq Pd$, because PdS is computed using a part of its DVMRP routing table. It is clear that whether it is Pd based or PdS based multicast, the first packet is always broadcast using the pseudo-diameter based packet forwarding condition. So number of duplicate packets generated in both cases will be the same.

However, when the second packet is multicast, number of prune packets generated depends on the relation $PdS \leq Pd$. If $PdS<Pd$, then larger number of prune packets are generated if Pd is used because of the larger scope of travel. Therefore, $N(PdS)<N(Pd)$.

On the other hand, if $PdS=Pd$, then because of identical scopes of travel, $N(PdS)=N(Pd)$. Hence, $N(PdS) \leq N(Pd)$.

Theorem 5: $N(DVMRP) \geq N(PdS)$.

Proof: In DVMRP, domain diameter DVMRPD is used to limit packet propagation distance during broadcasting. Since $DVMRPD \geq Pd$, therefore number of duplicate packets generated, during first packet broadcast when Pd is used, can never be more than the number generated in DVMRP.

Also, in DVMRP the whole truncated tree needs to be traversed to create the pruned multicast tree, whereas in super-pseudo-diameter based pruning, the value of PdS limits the maximum packet propagation distance. Since $DVMRPD \geq PdS$, therefore number of prune packets generated with PdS can never be more than the number generated in DVMRP. Hence the proof follows. The above observations lead to the notion of using the pseudo-diameter-based broadcasting followed by the super-pseudo-diameter-based pruning to achieve the best possible bandwidth utilization while delivering multicast traffic.

The performance method and system as disclosed and claimed herein was verified using a widely used network simulator known as NS2 simulator and as reflected in FIGS. 10-18. The simulator generated random DVMRP domains including network of for 30 routers, 40 routers, and 50 routers respectively that are shown in FIGS. 10, 11, and 12. In each domain, connections among the routers, placement of the routers, and the group members have been selected randomly each time the experiment has been run; thus making the scenario look similar to an actual network in the real networking world. All the routers used are multicast capable routers.

Multicast sessions with 10, 20, 30, 40, and 50 packets have been considered for each domain. In each multicast session, each group member is chosen as the multicast source. DVMRP, pseudo-diameter and super-pseudo-diameter based approaches have been executed. The average number of packets generated considering each group member as the source router in the 10 packet multicast session for each method in each domain has been calculated. It has been repeated the same for 20, 30, 40, and 50 packet-multicast sessions. The final total average values for 10, 20, 30, 40, and 50 packet-multicast sessions appear in the table of FIG. 13.

Figures 14A, 14B:
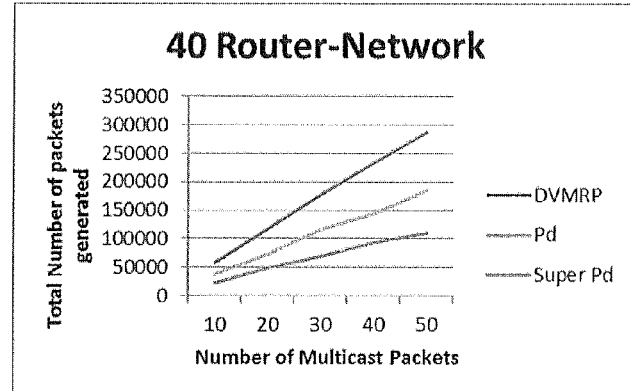
FIG. 14A illustrates the Average Number Of Packets Generated For 40 Node Networks.
FIG. 14B is a graph illustrating the total number of packets generated for 40 node networks.

In a similar way, the experiment has been repeated for the 40 router DVMRP domain and the total average values for the three different methods have appeared in FIG. 14. Similarly, FIG. 15 shows the total average values for the 50 router DVMRP domain.

Figures 13A, 13B:
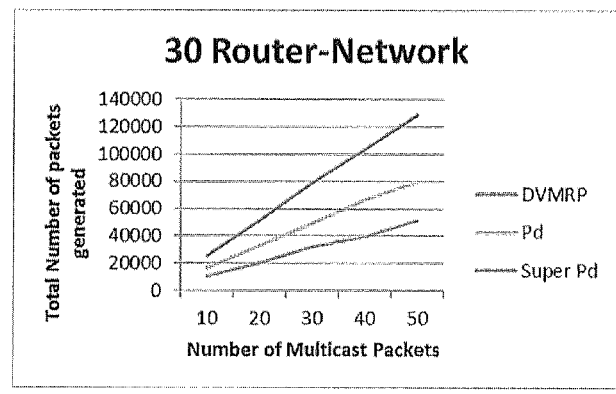
FIG. 13A illustrates the average number of packets generated for 30 node Networks.
FIG. 13B is a graph illustrating the total number of packets generated for 30 node networks

These results have also been plotted in the respective graphs as shown in FIGS. 13, 14 and 15. Chart representations of the experimental results are also shown in FIGS. 16, 17, and 18. These experimental results support the asserted improved performance of the method and system as disclosed and claimed herein.

The various implementations of the method and system for multicast routing protocol and examples shown above illustrate an improved multicasting computer network. A user of the present technology may choose any of the above implementation, or an equivalent thereof, depending upon the desired application. In this regard, it is recognized that various forms of the subject multicasting computer network could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

A user of the present method and system may choose any of the above implementations, or an equivalent thereof, depending upon the desired application. In this regard, it is recognized that various forms of the subject multicasting network method and system could be utilized without departing from the spirit and scope of the present implementation.

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present implementation. Accordingly, the specification and drawings are to be regarded in an illustrative rather than a restrictive sense.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled. The inventive subject matter may be represented in a variety of different implementations of which there are many possible permutations.

The methods described herein do not have to be executed in the order described, or in any particular order. Moreover, various activities described with respect to the methods identified herein can be executed in serial or parallel fashion. In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine or computing device. Further, while only a single machine is illustrated, the term "machine" shall also be taken to include any collection of machines that individually or jointly execute a set (or multiple sets) of instructions to perform any one or more of the methodologies discussed herein.

The computer system and client computers can include a processor (e.g., a central processing unit (CPU) a graphics processing unit (GPU) or both), a main memory and a static memory, which communicate with each other via a bus. The computer system may further include a video/graphical display unit (e.g., a liquid crystal display (LCD) or a cathode ray tube (CRT)). The computer system and client computing devices can also include an alphanumeric input device (e.g., a keyboard), a cursor control device (e.g., a mouse), a drive unit, a signal generation device (e.g., a speaker) and a network interface device.

The drive unit includes a computer-readable medium on which is stored one or more sets of instructions (e.g., software) embodying any one or more of the methodologies or systems described herein. The software may also reside, completely or at least partially, within the main memory and/or within the processor during execution thereof by the computer system, the main memory and the processor also constituting computer-readable media. The software may further be transmitted or received over a network via the network interface device.

The term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine, such as executable software code, and that cause the machine to perform any one or more of the methodologies of the present implementation. The term "computer-readable medium" shall accordingly be taken to include, but not be limited to, solid-state memories, and optical media, and magnetic media.

Other aspects, objects and advantages of the present invention can be obtained from a study of the drawings, the disclosure and the appended claims.

What is claimed is:

1. A method for a multi-casting routing protocol for a router including a condition check comprising the steps of:

interpreting data in a Distance Vector Multicasting Routing Protocol DVMRP table at a multicast source router and determining a maximum value to reach all destination routers from the multicast source router thereby defining a pseudo-diameter based on the multicast source router location, where the pseudo-diameter is less than an actual diameter of the DVMRP;

forming a broadcast tree, by performing at a receiving router a pseudo-diameter based conditional check for forwarding of copies of a first packet by the receiving router during broadcasting based on the multicast source router location as a condition for packet forwarding;

interpreting data at the Distance Vector Multicasting Routing Protocol DVMRP table at the multicast source router and determining a maximum value to reach only those routers which are connected to hosts with group members from the multicast source router thereby defining a super pseudo-diameter based on the source router location, where the super pseudo-diameter is less than the actual diameter of the DVMRP;

and forming a pruned tree from the broadcast tree by incorporating at the receiving router a super pseudo-diameter based conditional check for further forwarding of packets by the receiving router.

2. The method as recited in claim 1, further comprising:

reducing the number of duplicate packets which are generated during broadcasting by reducing a scope of travel of a first packet used in Distance Vector Multicasting Routing Protocol DVMRP using the pseudo-diameter of the multicast source to control packet propagation during broadcasting whereby the pseudo-diameter of the multicast source becomes the scope of travel.

3. The method as recited in claim 2, further comprising:
said receiving router sending its network address to the multicast source router when the host connected to the receiving router joins the group members.

4. The method as recited in claim 3, where incorporating at a receiving router a pseudo-diameter based conditional check further comprises:
performing a neighbor check determining if the first packet sent from the multicast source is from a neighbor within the group members and discarding the first packet if it is not from a neighbor; and
performing a domain check determining if the receiving router has another neighbor and if no terminating packet propagation and if yes determining if the pseudo-diameter has been reached and it no forwards the first packet.

5. A method for a multi-casting routing protocol for a router including a condition check comprising the steps of:
providing a network of routers communicably linked using Distance Vector Multicasting Routing Protocol;
interpreting data at a Distance Vector Multicasting Routing Protocol DVMRP table at a multicast source router and determining a maximum value to reach all destination routers from the multicast source router thereby defining a pseudo-diameter based on the source router location, where the pseudo-diameter is less than an actual diameter of the DVMRP;
and
forming a truncated broadcast tree, by incorporating at a receiving router a pseudo-diameter based conditional check for forwarding of copies of the first packet by the receiving router during broadcasting based on the multicast source router location as a condition for packet forwarding.

6. The method as recited in claim 5, further comprising:
reducing the number of duplicate packets which are generated during broadcasting by reducing a scope of travel of a first packet used in Distance Vector Multicasting Routing Protocol DVMRP using the pseudo-diameter of the multicast source to control packet propagation during broadcasting whereby the pseudo-diameter of the multicast source becomes the scope of travel.

7. The method as recited in claim 6, further comprising:
said receiving router sending its network address to the multicast source router when the host connected to the receiving router joins the group members.

8. The method as recited in claim 7, where incorporating at a receiving router a pseudo-diameter based conditional check further comprises:
performing a neighbor check determining if the first packet sent from the multicast source is from a neighbor within the group members and discarding the first packet if it is not from a neighbor; and
performing a domain check determining if the receiving router has another neighbor and if no terminating packet propagation and if yes determining if the pseudo-diameter has been reached and it no forwards the first packet.

9. A method for a multi-casting routing protocol for a router including a condition check comprising the steps of:
providing a network of routers communicably linked using Distance Vector Multicasting Routing Protocol;
interpreting data at the Distance Vector Multicasting Routing Protocol DVMRP table at the multicast source router and determining a maximum value to reach only those routers which are connected to hosts with group members from the multicast source router thereby defining a super pseudo-diameter based on the source router location, where the super pseudo-diameter is less than an actual diameter of the DVMRP;
and
forming a pruned tree by incorporating at a receiving router a super pseudo-diameter based conditional check for further forwarding of packets by the receiving router.

10. The method as recited in claim 9, comprising:
said receiving router forwarding a second packet having the super pseudo-diameter value to a receiving router neighbor.

11. The method as recited in claim 9, where incorporating at a receiving router a super pseudo-diameter based conditional check further comprises:
keeping a copy of the first packet if the receiving router is with group members, stopping propagation if the receiving router is a leaf of the source router or if super pseudo-diameter is reached, and forwarding a second packet with a newly reduced super pseudo-diameter to a downstream router of the receiving router.

12. The method as recited in claim 11, comprising:
sending a pruning message from the downstream router if the downstream router is a leaf of the receiving router.

13. A network of routers having a multi-casting routing protocol comprising:
a network of routers communicably linked by a Distance Vector Multicasting Routing Protocol DVMRP;
a Distance Vector Multicasting Routing Protocol DVMRP table electronically stored at a multicast source router, where the table includes a maximum value to reach all destination routers from the multicast source router thereby defining a pseudo-diameter based on the source router location, where the pseudo-diameter is less than an actual diameter of the DVMRP;
a broadcast tree having a domain defined as the pseudo-diameter, by incorporating at a receiving router a pseudo-diameter based conditional check for forwarding of copies of a first packet by the receiving router during broadcasting based on the source router location as a condition for packet forwarding;
said Distance Vector Multicasting Routing Protocol DVMRP table at the multicast source router where the table includes a maximum value to reach only those routers which are connected to hosts with group members from the multicast source router thereby defining a super pseudo-diameter based on the source router location, where the super pseudo-diameter is less than the actual diameter of the DVMRP;
and
a pruned broadcast tree having a domain defined as the super pseudo-diameter based conditional check for further forwarding of packets by the receiving router.

14. The network of router as recited in claim 13, where the Distance Vector Multicasting Routing Protocol DVMRP table at the multicast source includes the address of the receiving router.

* * * * *